Aug. 19, 1958
R. L. EASLEY
2,848,412
ELECTRIC TREATER
Filed June 4, 1954
2 Sheets-Sheet 1
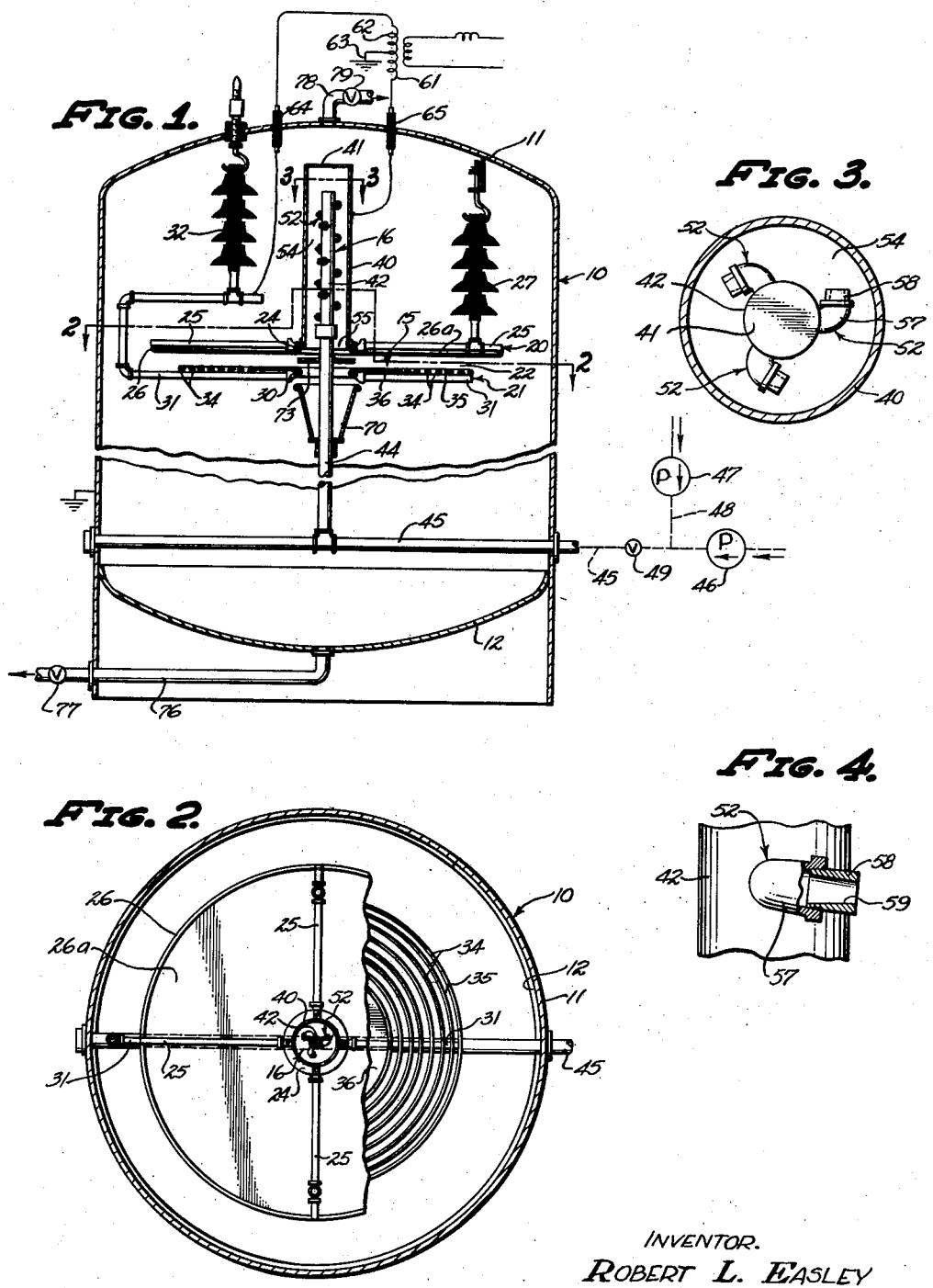
INVENTOR.
ROBERT L. EASLEY
BY HIS ATTORNEYS.
HARRIS, KIECH, FOSTER & HARRIS Aug. 19, 1958

R. L. EASLEY 2,848,412

ELECTRIC TREATER

Filed June 4, 1954

INVENTOR.
ROBERT L. EASLEY

BY HIS ATTORNEYS.
HARRIS, KIECH, FOSTER & HARRIS

United States Patent Office 2,848,412
Patented Aug. 19, 1958

2,848,412

ELECTRIC TREATER

Robert L. Easley, Houston, Tex., assignor to Petrolite Corporation, Wilmington, Del., a corporation of Delaware Application June 4, 1954, Serial No. 434,428

11 Claims. (Cl. 204—302)

My invention relates to the electric resolution of oil-continuous emulsions, typically crude oil emulsions as produced from wells or as synthesized in the electrical desalting process. More particularly, the invention relates to a novel electric emulsion treater facilitating the electric treatment of such emulsions.

It is conventional to introduce such oil-continuous emulsions directly into a main treating field of sufficient intensity to coalesce the suspended droplets of the dispersed phase into masses of sufficient size to gravitate from the oil. The dispersed phase of such emulsions is composed of a material, usually aqueous, that is sufficiently immiscible with the oil to produce an internal or dispersed phase. Initially, the dispersed droplets are of such small size or are so stabilized that they will not readily gravitate from the oil phase. However, the electric field coalesces such dispersed droplets and it is found that the resulting coalesced masses gravitate rapidly from the oil, usually in the same container as that in which electric treatment takes place.

Difficulties have been experienced in treating certain emulsions, such difficulties being evidenced by lack of clean separation between oil and water and/or by an undesirably high percentage of residual dispersed-phase material in the separated oil. It is an object of the present invention to improve electric treatment of emulsions in these respects, the electric treater of the present invention producing cleaner effluents. For example, the treater of the invention when used to resolve various water-in-oil emulsions will produce water bleeds substantially free of oil, as compared with earlier treaters wherein such water bleeds resulting from such oils will be contaminated with residual oil or sludge. Also, the treater of the present invention is capable of reducing the residual amount of aqueous material in the separated oil, as compared with prior treaters operating on so-called "difficult" emulsions.

It is an object of the present invention to jet the emulsions substantially tangentially into a confined treating space to establish therein a high degree of turbulence. A further object is to discharge the emulsion substantially tangentially by use of a plurality of nozzles spaced peripherally of a pipe which carries these nozzles. Still a further object is to discharge the emulsion through a plurality of nozzles which are inclined relative to a plane at right angles to the axis of the pipe, each of the streams having a component of motion in a direction longitudinally of the pipe, the nozzles thus tending to advance the emulsion along the confined space and from one end thereof.

It has been found that the electric treatment of various emulsions is distinctly improved by an initial electric pretreatment serving to treat the emulsion without substantial separation of the treated emulsion constituents. It is an object of the invention to provide an electric treater accomplishing this result; also to effect such preliminary treatment under high turbulence induced, for example, by violent swirling of the emulsion in a confined space. Another object is to provide a treater in which such emulsion escapes from such confined space through an open end thereof and moves directly into a main treating field. A further object is to provide a structure in which preliminarily-treated emulsion is deflected to flow into the main treating field.

It has been found desirable to employ a main treating field bounded by electrodes of relatively extensive size or area. It is an object of the invention preliminarily to treat an emulsion under high turbulence in a relatively small electric field and then to introduce the emulsion constituents, before substantial separation thereof, into the main treating field. A further object is to provide a main treating field in which the emulsion is confined to flow in a desired path and in which coalesced masses can separate therefrom during such flow.

Further objects and advantages of the invention will be evident to those skilled in the art from the following description of exemplary embodiments.

Refering particularly to the drawings:

Fig. 1 is a vertical sectional view of one embodiment of the invention;

Figs. 2 and 3 are respectively horizontal cross-sectional views taken along corresponding lines of Fig. 1;

Fig. 4 is a fragmentary view illustrating one of the tangentially-discharging nozzles;

Figure 5:
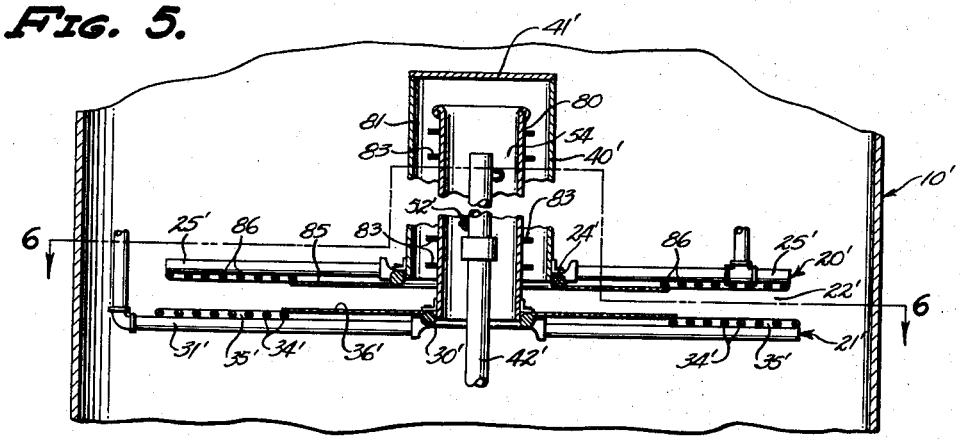
Fig. 5 is a fragmentary vertical sectional view of an alternative embodiment of the invention.

Referring particularly to Fig. 1, the treater of the invention includes a closed pressure-type container 10 illustrated as an upright cylinder closed at its upper and lower ends by heads 11 and 12. Within the container 10 is a pair of superimposed main electrodes 15 and a pair of auxiliary electrodes 16 which will be separately described.

The pair of main electrodes 15 includes an upper electrode 20 and a lower electrode 21 defining an outwardly extending interelectrode space 22. The upper electrode 20 includes a framework comprising a ring 24 with sockets therein to receive radially-extending arms 25 carrying a peripheral ring 26. This upper electrode is prefarably substantially impervious and provides a field-bounding annular plate 26a substantially filling the space between the rings 24 and 26 and suitably secured thereto. The upper electrode 20 is suspended from insulators 27 in a conventional manner.

The lower electrode 21 is preferably foraminous, at least in its outer portion. It includes a ring 30 providing sockets which receive arms 31, certain of which extend upward around the upper electrode 20 to be supported by insulators 32. A plurality of concentric circular rods or rings 34 are secured to the arms 31 in an outer zone, being spaced radially from each other to provide spaces 35 through which coalesced water masses may gravitate. If desired, these rings may extend to the vicinity of the ring 30, but preferably the inner zone of the electrode 21 is subsantially impervious, being made of an annular plate 36 extending between the ring 30 and the innermost ring 34.

The invention contemplates that the pair of auxiliary electrodes 16 shall preliminarily treat the emulsion before delivery thereof to the interelectrode space 22. The auxiliary electrodes in Fig. 1 include a cylindrical member shown as an outer cylindrical electrode 40 closed at its upper end by a plate 41. An upper end zone of an inner pipe electrode 42 extends coaxially within the outer cylindrical electrode 40, being closed at its upper end. The lower portion of this inner pipe electrode is secured to a riser pipe 44 communicating interiorly with a cross-pipe 45 which may be connected to a pump 46 supplying the incoming emulsion under pressure to the interior of the inner pipe electrode 42. In the electrical desalting process, the pump 46 may deliver a salty crude oil of low water content which is mixed with relatively fresh water delivered by a pump 47 through a pipe 48 and mixed with the oil by use of a mixing valve 49.

The emulsion discharges from the interior of the inner pipe electrode 42 through a plurality of fittings indicated generally by the numeral 52 (Fig. 3). Each of these fittings is designed to discharge a stream of emulsion in a direction substantially tangential to a circle drawn about the common axis of the electrodes 40 and 42. This discharge is into a confined space open at one end. In the embodiment of Figs. 1–4 the discharge is into an annular treating space 54 between the electrodes 40 and 42, this treating space being open at an exit end 55 (Fig. 1). Figs. 3 and 4 illustrate a very simple construction for each fitting 52, consisting of a street ell 57 threaded into a corresponding opening of the inner pipe electrode 42 and having a nozzle 58 threaded into the female end of the ell. Best results have been obtained by the use of a nozzle 58 of the form shown in Fig. 4 and providing a tapered discharge opening 59 which reduces in size in the direction of discharge. Additionally, it is often desirable to incline the direction of discharge relative to a plane at right angles to the common axis of the electrodes 40 and 42. Significantly improved results have been obtained with the treater of Fig. 1 if the nozzles 58 are angled downwardly a matter of several degrees, as suggested in Fig. 4, the discharge having a downward component of motion assisting the discharge of emulsion from the open exit end 55 of the annular treating space 54.

It is contemplated that electric fields will be established both in the annular treating space 54 and in the interelectrode space 22. In the embodiment of Figs. 1–4, this is accomplished by grounding the inner pipe electrode 42 through the container 10 and connecting the outer cylindrical electrode 40 electrically and in substantially fluid-tight relationship with the ring 24. A double-voltage transformer means may be used to establish a high potential difference between the electrodes 40 and 42 and an even higher potential difference between the electrodes 20 and 21. Fig. 1 diagrammatically illustrates such an energizing system as including a transformer having additively-connected secondary windings 61 and 62 with a common terminal grounded at 63. The high voltage terminal of the winding 62 is connected through a bushing 64 with the framework of the lower electrode 21. The high voltage terminal of the winding 61 is connected through a bushing 65 with the outer cylindrical electrode 40 and thence with the upper electrode 20.

Considering the action which takes place in the treating space 54, it will be apparent that the emulsion is jetted thereinto at a plurality of peripherally-spaced positions, preferably at positions which are in a helical path relative to the inner pipe electrode 42. The emulsion in the treating space 54 is thus swirled violently. The streams discharging from the nozzles 58 have a jetting action on the liquid in the annular treating space 54 and it will be apparent that the oil is subjected to repeated jetting actions from the several jets as it moves downwardly in the treating space. The jet velocity of the emulsion may be as high as 1200 ft./min. or higher, giving rise to rapid swirling and high turbulence. It will be observed that the emulsion will be subjected to fields between the outer periphery of the pipe electrode 42 and the inner periphery of the outer cylindrical electrode 40. In addition, the emulsion will periodically be subjected to higher voltage gradients in the narrower gaps between the nozzles 58 and the electrode 40, being subjected to such higher gradients in zones where the velocity or turbulence is very high due to the jetting of a stream of emulsion from the adjacent nozzle. These actions appear to give a very desirable preliminary treatment to the emulsion.

At the same time, this preliminary treatment in itself is usually insufficient to resolve the emulsion and produce the desired clean phases when the electrically treated emulsion constituents are permitted to settle. It is a feature of the present invention that these electrically treated emulsion constituents are moved into the interelectrode space 22 promptly and without any substantial separation of the constituents. It is usually desirable to use one or more flow-spreading means for deflecting the large stream of treated emulsion issuing from the exit end 55 of the treating space 54 to cause the emulsion to flow outwardly into the inner zone of the interelectrode space 22. Fig. 1 illustrates two such flow-spreading means.

In the first place, outward flow of the treated emulsion is effected by a bucket-like baffle 70 connected to the riser pipe 44 and which effectively closes the opening provided by the ring 30. In this connection, the baffle 70 has an upper lip which can be disposed quite close to the ring 30 without causing short-circuiting.

In the second place, however, it is desirable to employ a baffle which more directly deflects the issuing treated emulsion outwardly into the inlet or central portion of the interelectrode space 22. In this connection, Fig. 1 shows a baffle member 73 which can be used with or as a substitute for the baffle 70. The baffle member 73 is shown suitably connected to the riser pipe 44, preferably at a position near the midsection of the interelectrode space 22. It may have a flared upper surface, as shown, to assist in deflecting the downwardly-flowing annular stream outwardly. In some instances, the periphery of the baffle member 73 can be smaller than shown in Fig. 1, it being only necessary to deflect the stream to pass outwardly between the plates 26a and 36 of the upper and lower electrodes 20 and 21. On the other hand, it must be realized that there will be an intense electric field between the edge of the baffle member 73 and the upper electrode 20, and that this field can be accentuated to shock-treat the emulsion constituents at the instant of entry into the interelectrode treating space 22.

In the interelectrode treating space 22 the emulsion constituents move radially outward at ever-reducing velocity, being subjected during this outward movement to the double-voltage field between the electrodes 20 and 21. The coalesced masses can settle from the oil during this movement and can drop through the spaces 35 to reach a body of separated material in the bottom of the container 10. This material can be continuously or intermittently withdrawn through an effluent pipe 76 equipped with a back-pressure valve 77. The separated oil rises in the container 10 and is withdrawn through an effluent pipe 78 equipped with a back-pressure valve 79.

Figure 6:
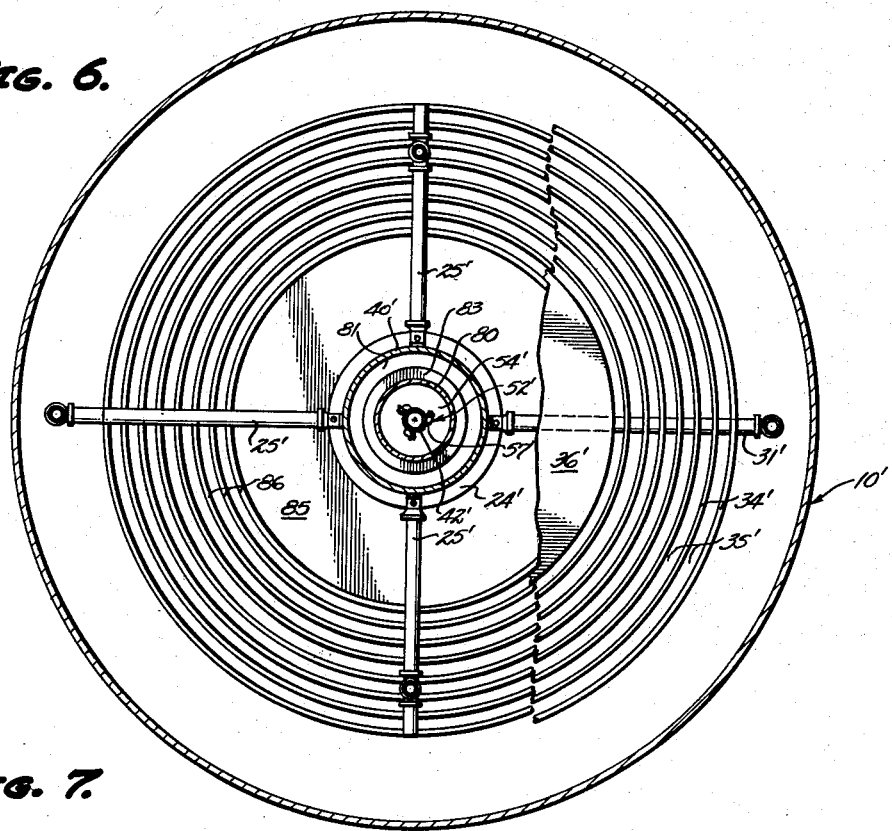
Fig. 6 is a horizontal sectional view taken along the line 6—6 of Fig. 5.
Figure 7:
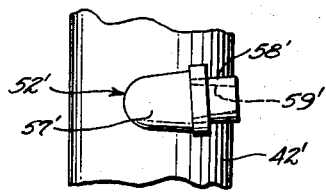
Fig. 7 is a fragmentary view illustrating one of the tangentially discharging nozzles of Fig. 5.

In the alternative embodiment illustrated in Figs. 5–7, certain parts are designated by primed numerals, relative to the previously-described embodiment. The inner pipe electrode 42' is identical with the corresponding electrode 42 except that the nozzles 58' are here inclined several degrees upwardly to produce a component of motion causing the emulsion to rise in the annular treating space 54'. This space is open at both ends and is formed between the inner pipe electrode 42' and an outer cylindrical electrode 80 open at both ends. The lower end of this outer cylindrical electrode 80 is secured to the ring 30' of the lower electrode.

The outer cylindrical electrode 80 is in effect an intermediate electrode, positioned between the inner pipe electrode 42' and the outer cylindrical electrode 40' which is secured to the ring 24' and which is closed at 41'. Due to the upward inclination of the nozzles 58', the swirling emulsion stream moves upwardly in the annular treating space 54' and downwardly through an annular space 81 between the cylindrical electrodes or members 40' and 80. A double-voltage field may be established in the space 81 and the gradients therein may be locally intensified by disposing a series of flanges 83 on the outer cylindrical electrode 80.

Here again, the annular preliminarily-treated stream should be deflected outwardly into the interelectrode treating space 22'. This is accomplished in the embodiment of Fig. 5 by the annular plate 36', the ring 30' being somewhat smaller in diameter than the ring 24' in this embodiment. As illustrated in Fig. 5, the upper electrode 20' is of slightly different construction, providing an inner portion closed by an annular plate 85 and an outer foraminous portion formed by circular rods 86 secured to the arms 25'. In this embodiment, either the oil or the coalesced water masses or both may respectively rise and drop through the outer portions of the upper and lower electrodes 20' and 21'. The embodiment of Fig. 5 has the additional advantage that the incoming emulsion receives preliminary treatment both in a lower-voltage field within the annular treating space 54' and a double-voltage field within the annular treating space 81.

Various changes and modifications can be made without departing from the spirit of the invention and will be apparent to those skilled in the art from the foregoing description.

I claim as my invention:

1. In an electric emulsion treater, the combination of: an inner pipe electrode closed at one end; means for delivering emulsion under pressure to the interior of said pipe electrode; an outer cylindrical electrode; means for mounting said electrodes in coaxial relationship and for insulating one from the other, said cylindrical electrode surrounding said pipe electrode to define therebetween an annular treating space open at an exit end, the axial length of said annular treating space being very much greater than its width measured between said electrodes; means for establishing a potential difference between said electrodes to establish an emulsion-treating electric field in said annular treating space; a plurality of fittings communicating between the interior of said pipe electrode and said annular treating space, said fittings extending outwardly from the periphery of said pipe electrode at spaced positions and being electrically connected thereto so that said electric field is concentrated adjacent said fittings, some of said positions being spaced from other of such positions circumferentially of said pipe electrode and some of the positions being spaced from others longitudinally of said pipe electrode, said fittings being distributed throughout a substantial length of said annular treating space, each fitting including an open discharge orifice facing in a direction substantially tangential to a circle drawn around the common axis of said electrodes and discharging a unitary stream of emulsion in such direction; and means for maintaining said annular treating space filled with liquid comprising the constituents of the emulsion, said unitary streams jetting into said liquid and forming a larger stream filling and issuing from said open exit end of said treating space after electric treatment therein.

2. An electric emulsion treater as defined in claim 1 including electrode means comprising two outwardly extending electrodes defining another annular treating space coaxial with said first-named annular treating space but extending angularly therefrom at the exit end thereof; a deflection member extending from said inner pipe electrode at a position between and spaced from said outwardly extending electrodes at least partially across said open exit end and spreading said larger stream in its entirety into said other annular treating space, and means for establishing an electric field in said other annular treating space to further treat said liquid comprising the constituents of said emulsion.

3. An electric emulsion treater as defined in claim 1 in which each discharge orifice is angled relative to a radial plane passing through it and at right angles to said common axis, all of said discharge orifices being angled toward said open exit end of said treating space to jet the emulsion into the treating space substantially tangentially but with a component of motion toward said open exit end to force the emulsion along said treating space toward said open exit end.

4. In an electric emulsion treater, the combination of: an inner pipe electrode closed at one end; an outer cylindrical electrode; means for mounting said electrodes in coaxial relationship with said cylindrical electrode surrounding said pipe electrode for a distance much greater than the radial distance between said electrodes; means for establishing a high-voltage electric field in the annular space between said electrodes; means for closing the end of said outer cylindrical electrode at a position beyond and spaced from the closed end of said inner pipe electrode, the opposite end of said outer cylindrical electrode being an exit end; and means for discharging the emulsion into said annular space at a large number of positions and for maintaining said annular space filled with emulsion constituents discharging from said exit end as an annular stream, said last-named means including means for delivering emulsion under pressure to the interior of said pipe electrode, and a large number of angled fittings communicating between the interior of said inner pipe electrode and said annular space, said fittings being carried by, electrically connected to and extending outwardly from said pipe electrode at positions spaced from each other both circumferentially of said pipe electrode and longitudinally thereof in a pattern disposing said fittings substantially throughout the length of said annular space and completely around the periphery of said pipe electrode, each angled fitting including an open discharge orifice facing in a direction substantially tangential to a circle drawn around the common axis of said electrodes close to the periphery of said inner pipe electrode, each discharge orifice discharging a unitary stream of said emulsion in its said tangential direction, said electric field being concentrated at said fittings and the multiple tangential discharge of said streams swirling violently the emulsion constituents throughout the longitudinal length of said annular space.

5. An electric emulsion treater as defined in claim 4 including an annular electrode extending outwardly from said exit end of said outer cylindrical electrode providing a central opening communicating with said exit end to receive said annular stream therefrom, a supplemental electrode having a central opening, means for mounting said supplemental electrode spaced from said annular electrode to define therebetween a main treating space receiving said annular stream for further electric treatment, said inner pipe electrode having an imperforate portion extending through said last-named central opening, and means for establishing a high-voltage electric field in said main treating space.

6. An electric emulsion treater as defined in claim 1 in which said common axis is substantially vertical and said open exit end faces downwardly, and including an upper substantially flat electrode electrically connected to and supported by the lower end of said outer cylindrical electrode having a central opening registering with said open exit end to receive said larger stream issuing therefrom, a lower substantially flat electrode below said upper electrode and spaced therefrom to define a main outwardly-extending treating space therebetween, means for establishing a high-voltage electric field in said outwardly-extending treating space, and a flow-spreading member in the path of flow of said large stream issuing from said open exit end deflecting said stream outwardly into said main treating space.

7. In an electric emulsion treater, the combination of: an inner pipe electrode closed at one end; means for delivering emulsion under pressure to the interior of said pipe electrode; an outer cylindrical electrode; means for mounting said electrodes coaxially about a substantially vertical axis and for insulating one from the other, said cylindrical electrode surrounding said pipe electrode to define therebetween an annular treating space open at an exit end; means for establishing a potential difference between said electrodes to establish an emulsion-treating electric field in said annular treating space; a plurality of fittings communicating between the interior of said pipe electrode and said annular treating space, said fittings extending outwardly from the periphery of said pipe electrode at spaced positions and being electrically connected thereto so that said electric field is concentrated adjacent said fittings, some of said positions being spaced from other of such positions circumferentially of said pipe electrode and some of the positions being spaced from others longitudinally of said pipe electrode, said fittings being distributed throughout a substantial length of said annular treating space, each fitting including an open discharge orifice facing in a direction substantially tangential to a circle drawn around the common axis of said electrodes and discharging a unitary stream of emulsion in such direction; means for maintaining said annular treating space filled with liquid comprising the constituents of the emulsion, said unitary streams jetting into said liquid and forming a larger stream filling and issuing from said open exit end of said treating space after electric treatment therein; a circular flow-spreading member protruding from said inner pipe electrode at a position downstream from said open exit end of said treating space to deflect outward said stream issuing from said open exit end, said flow-spreading member having a circular periphery substantially equidistant from the center of said pipe electrode; a pair of superimposed circular substantially horizontal electrodes concentric with said inner and outer electrodes at spaced positions downstream from said open exit end, said substantially horizontal electrodes including an upper substantially impervious electrode connected to the lower open end of said outer cylindrical electrode and a lower foraminous electrode, said upper and lower electrodes being electrically insulated from each other, said flow-spreading member deflecting said stream issuing from said open exit end to flow into the interelectrode space between said upper and lower electrodes, and means for establishing another electric field in said interelectrode space.

8. In an electric emulsion treater, the combination of: a pair of main electrodes spaced from each other along a vertical axis; means for insulating said main electrodes from each other and for establishing an electric field in the interelectrode space, said interelectrode space having a central mouth formed about said vertical axis; an outer cylindrical auxiliary electrode coaxial with said vertical axis, said outer electrode providing an open exit end; an inner auxiliary electrode and means for mounting same coaxially within said outer cylindrical electrode to form an annular treating space therebetween, said inner auxiliary electrode comprising a closed-ended pipe with a plurality of discharge orifices respectively discharging in directions substantially tangential to circles drawn around the axis of said pipe, said discharge orifices being distributed longitudinally and peripherally throughout that portion of said pipe bounding said annular treating space; means for maintaining a potential difference between said inner and outer auxiliary electrodes to establish an electric field therebetween; means for supplying to said pipe under pressure the emulsion to be treated, said emulsion jetting from said orifices to form a fast-swirling stream filling and advancing along said annular treating space toward said open exit end; and means for conducting all of the material of said swirling stream from said open exit end to said central mouth of said interelectrode space for further electric treatment.

9. In an electric emulsion treater, the combination of: upper and lower horizontally extending superimposed main electrodes of substantial area, each of said electrodes having a central opening; means for insulating said main electrodes from each other and for establishing a high-voltage electric field in the interelectrode space; a closed-top outer cylindrical member providing an open end connected directly and in substantially fluid-tight relationship with said central opening of said upper electrode; an open-topped inner cylindrical member centrally within said closed-topped outer member having an open lower end connected directly and in substantially fluid-tight relationship with said central opening of said lower electrode and having an open upper end terminating below said closed-top of said outer cylindrical member, said cylindrical members being respectively electrically connected to said main electrodes and being spaced from each other to define a preliminary treating space; and means for delivering the emulsion to be treated to the interior of said inner cylindrical member, said emulsion delivery means including a pipe extending into said inner cylindrical member, means for delivering the emulsion to the interior of said pipe, and a plurality of fittings spaced along and around said pipe having openings directed tangentially into said inner cylindrical member, said emulsion flowing from said open upper end thereof, thence downwardly through said preliminary treating space and thence into said interelectrode space.

10. In an electric emulsion treater, the combination of: an upper circular electrode substantially impervious except for a central opening therein; a lower circular electrode having a central opening directly below said central opening of said upper electrode, at least a portion of said lower electrode around said central opening thereof being foraminous; means for insulating said circular electrodes from each other and for establishing a high-voltage electric field in the interelectrode space; an upright pipe extending centrally through said openings but spaced from each electrode, there being an upper section of said pipe closed at its upper end extending a substantial distance above said upper electrode, there being a large number of holes perforating said upper section and spaced peripherally and longitudinally thereof throughout said section; elbowed fittings respectively in said holes and providing orifices directed substantially tangential to circles drawn about the axis of said upright pipe; means for delivering the emulsion to be treated to said pipe under pressure, said emulsion discharging throughout the length of said upper section as a plurality of tangentially directed unitary streams from said orifices; a cylindrical electrode coaxial with and forming an annular space around said upper section of said pipe, said cylindrical electrode providing a closed upper end above the closed end of said upper section of said pipe and providing an open lower end connected to said opening of said upper electrode; means for developing a potential difference between said upper section of said pipe and said cylindrical member, said streams discharging into said annular space therebetween to fill said space and discharge as a large annular stream from said open lower end into said interelectrode space; and a flow-spreading member extending outwardly from said pipe at a position below said open lower end but in the path of discharge of said large annular stream, said flow-spreading member being close to said lower circular electrode and spreading such large annular stream to flow into and outwardly along said interelectrode space.

11. An electric treater as defined in claim 10 in which said flow-spreading member is below said lower circular electrode and provides a peripheral lip below but spaced close to the periphery of the central opening of such lower electrode, and in which said flow-spreading member is electrically insulated from said lower electrode.

References Cited in the file of this patent

UNITED STATES PATENTS

| | | |
|---|---|---|
| 987,115 | Cottrell | Mar. 21, 1911 |
| 1,838,926 | Fisher | Dec. 29, 1931 |
| 1,838,980 | Worthington | Dec. 29, 1931 |
| 1,978,794 | Van Loenen | Oct. 30, 1934 |
| 2,083,798 | Roberts | June 15, 1937 |
| 2,083,801 | Eddy | June 15, 1937 |
| 2,663,687 | Bailey | Dec. 22, 1953 |

FOREIGN PATENTS

| | | |
|---|---|---|
| 709,626 | Great Britain | June 2, 1954 |